(12) United States Patent
Tsukada

(10) Patent No.: US 8,237,943 B2
(45) Date of Patent: Aug. 7, 2012

(54) IMAGE PROCESSING APPARATUS AND CONTROL METHOD FOR THE SAME

(75) Inventor: Nobuyuki Tsukada, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 658 days.

(21) Appl. No.: 12/411,197

(22) Filed: Mar. 25, 2009

(65) Prior Publication Data
US 2009/0242622 A1    Oct. 1, 2009

(30) Foreign Application Priority Data

Mar. 26, 2008   (JP) .................................. 2008-081255

(51) Int. Cl.
*H04N 1/04* (2006.01)
(52) U.S. Cl. ........ 358/1.13; 358/474; 358/497; 358/498
(58) Field of Classification Search .................. 358/1.13, 358/474, 497, 498
See application file for complete search history.

(56) References Cited

FOREIGN PATENT DOCUMENTS

| JP | 2-008978 | 1/1990 |
|---|---|---|
| JP | 2-120996 | 5/1990 |
| JP | 2002-055921 | * 2/2002 |

* cited by examiner

*Primary Examiner* — Houshang Safaipour
(74) *Attorney, Agent, or Firm* — Canon USA Inc. IP Division

(57) ABSTRACT

An image processing apparatus prints a mark-sensing sheet containing a plurality of entry fields. The image processing apparatus reads the mark-sensing sheet, determines a marked entry field entered by a user among the plurality of entry fields of the mark-sensing sheet, and stores information indicating the determined result. When the image processing apparatus rereads the mark-sensing sheet, the image processing apparatus compares the marked entry field entered by the user and information stored in a memory, thereby detecting the marked entry field that the user additionally enters for revision before rereading.

12 Claims, 12 Drawing Sheets

PHOTOGRAPH DESIGNATION MARK-SENSING SHEET  51

52 — PAPER SIZE: ⊂⊃ L ⊂⊃ 2L ⊂⊃ POSTAL CARD ⊂⊃ A4
53 — PAPER TYPE: ⊂⊃ PLAIN PAPER ⊂⊃ GLOSSY PAPER ⊂⊃ PHOTOGRAPHIC PAPER
54 — PRINT QUALITY: ⊂⊃ HIGH QUALITY ⊂⊃ STANDARD QUALITY ⊂⊃ LOW QUALITY
55 — DATE PRINTING: ⊂⊃ YES ⊂⊃ NO
56 — IMAGE CORRECTION: ⊂⊃ YES ⊂⊃ NO
57 — PHOTOGRAPH SELECTION (NUMBER OF COPIES):

PHOTOGRAPH DESIGNATION MARK-SENSING SHEET

PAPER SIZE: ■ L ◯ 2L ◯ POSTAL CARD ◯ A4
PAPER TYPE: ◯ PLAIN PAPER ■ GLOSSY PAPER ◯ PHOTOGRAPHIC PAPER
PRINT QUALITY: ■ HIGH QUALITY ◯ STANDARD QUALITY ◯ LOW QUALITY
DATE PRINTING: ■ YES ■ NO
IMAGE CORRECTION: ■ YES ◯ NO

81

PHOTOGRAPH SELECTION (NUMBER OF COPIES):

01 ☺  ■ 0  ■ 1  ◯ 2  ◯ 3      — 83
02 ♡  ◯ 0  ◯ 1  ■ 2  ◯ 3
03 ☾  ■ 0  ■ 1  ◯ 2  ◯ 3      — 82
04 ☆  ◯ 0  ◯ 1  ◯ 2  ■ 3
05 ☀  ◯ 0  ■ 1  ◯ 2  ◯ 3
06 ⚡  ■ 0  ◯ 1  ◯ 2  ◯ 3

IMAGE PROCESSING APPARATUS AND CONTROL METHOD FOR THE SAME

BACKGROUND OF THE INVENTION

1. Field of the Invention

The present invention relates to an image processing apparatus that detects marks (entry) on a read mark-sensing sheet filled in by a user to determine content instructed by the user according to the detected result. In particular, the image processing apparatus detects corrections of marks made by the user based on the contents of the read mark-sensing sheet.

2. Description of the Related Art

An image processing apparatus may include a function in which a user provides the image processing apparatus with instructions using a mark-sensing sheet in which a plurality of mark (entry) fields are printed for each selected item. A user fills in or darkens a mark (entry) field according to a selection by the user using a pencil, a pen, or the like among a plurality of mark fields printed on a mark-sensing sheet, and the image processing apparatus optically reads the mark-sensing sheet. The image processing apparatus recognizes content selected by the user after optically reading the mark-sensing sheet.

The user may find a mark mistake on the mark-sensing sheet after the image processing apparatus has read the content entered on the mark-sensing sheet. The user may want to erase a field where a mark mistake is found to correct the field on the mark-sensing sheet. Alternatively, the user may also reprint the mark-sensing sheet and mark it again rather than erase the field where the mark mistake was found.

When the user erases the field where the user marked the mark-sensing sheet or reprints the mark-sensing sheet, it may take a long time for the corrected mark-sensing sheet to be read again. Further, resources such as an eraser, correction fluid, ink for reprinting, and paper are used.

A method for avoiding the use of additional resources and reducing the time needed for correcting the mark-sensing sheet is described in Japanese Patent Application Laid-Open No. 2-8978. Japanese Patent Application Laid-Open No. 2-8978 discusses a mark field for invalidating the marked field on the mark-sensing sheet. When the mark-sensing sheet is read, if the mark field for invalidating the marked field is filled in, the mark in the marked field on the mark-sensing sheet is invalid.

To address the user's need to change the mark field to be marked and not merely canceling the marked field, in Japanese Patent Application Laid-Open No. 2-120996, a technique is discussed where a user marks a mark field for revision provided for each selection item. If a user has filled in the wrong field different from the intended selection item, the user may correct the error using the mark field for revision.

However, in the above-described technique, the quantity of revision fields that are required is equivalent to the quantity of selection items on the mark-sensing sheet and redundant mark fields must be added on the mark-sensing sheet having limited area. The size of the mark-sensing sheet may increase due to the added mark fields. This may also increase the number of mark-sensing sheets required. Furthermore, an increase in the number of mark fields may increase the time required to detect marks in a mark field after reading.

In Japanese Patent Application Laid-Open No. 2002-55921, a technique is discussed where a plurality of mark fields has been filled in for a selected item. The newer content is used for updating information to the image processing apparatus.

However, this technique may limit the selection items to those selections that can be estimated as newer content. Unfortunately, which selection is newer may not always be determined. Thus, a change not considered an update (e.g., a change from "occupied" to "unoccupied"), makes revision more difficult.

SUMMARY OF THE INVENTION

The present invention is directed to a method for controlling an image processing apparatus capable of revising marked contents where a mark mistake is made without erasing the mark mistake when a user is aware of the mark mistake on a sheet to revise it after an entered mark-sensing sheet is read.

According to an aspect of the present invention, a method for controlling an image processing apparatus that includes a printing unit and a reading unit is provided. The reading unit is configured to read a sheet. The image processing apparatus can be controlled based on image data obtained by reading the sheet, which is printed by the printing unit. The method includes causing the printing unit to print the sheet containing at least one selection item, the at least one selection item having a plurality of entry fields corresponding to a plurality of options to be selected for the at least one selection item. The method continues by determining the entry field entered by a user among the plurality of entry fields for the at least one selection item based on image data obtained by reading the sheet to store information indicating the entry field entered by the user in a memory, and detecting a revised entry field entered by the user for the at least one selection item, after the information indicating the entry field entered by the user is stored in the memory, the revised entry field is detected by comparing between image data obtained by reading the sheet after the information is stored in the memory and the stored information in the memory.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates an example of a printed result of a photograph designation mark-sensing sheet.

FIG. 11 illustrates a photograph designated mark-sensing sheet where designated contents in a photograph designated mark-sensing sheet are changed.

DETAILED DESCRIPTION OF THE EMBODIMENTS

Various exemplary embodiments, features, and aspects of the invention will be described in detail below with reference to the drawings.

Figure 1A:
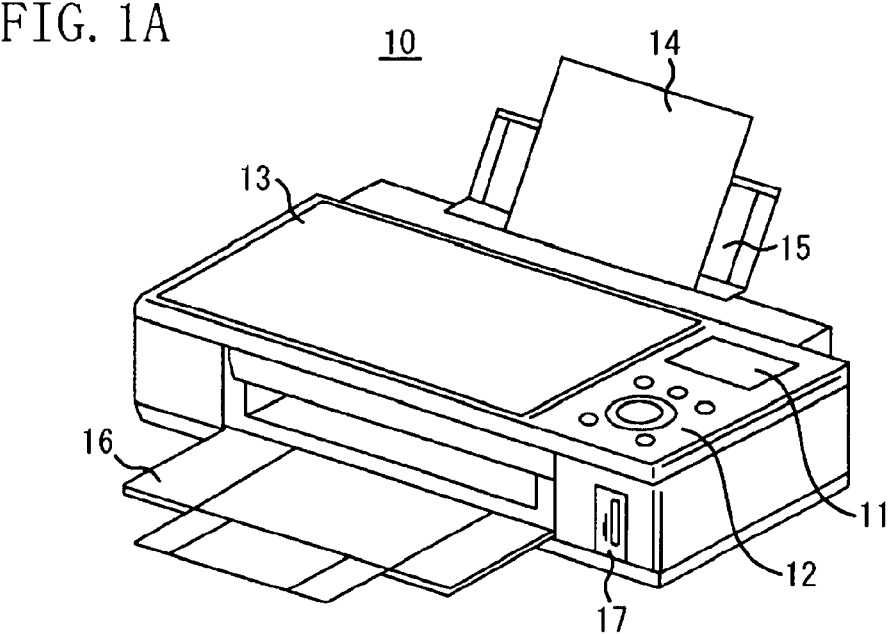
FIG. 1A illustrates an image processing apparatus according to an exemplary embodiment of the present invention.

FIG. 1A illustrates an image processing apparatus according to an exemplary embodiment of the present invention. An image processing apparatus 10 includes a liquid crystal monitor 11, an operation panel 12, a document positioning plate cover 13, a paper feed tray 15, a paper discharge tray 16, and a memory card slot 17. The liquid crystal monitor 11 displays a state of the image processing apparatus 10 and an image read from a memory card 19 (see FIG. 1B). The operation panel 12 includes a press button (not illustrated), which is used by a user for controlling the image processing apparatus 10. The document positioning plate cover 13 protects a document positioning plate. The paper feed tray 15 inserts a sheet 14. The paper discharge tray 16 receives a sheet 14 after it is printed. The memory card slot 17 is configured to receive the memory card 19.

Figure 1B:
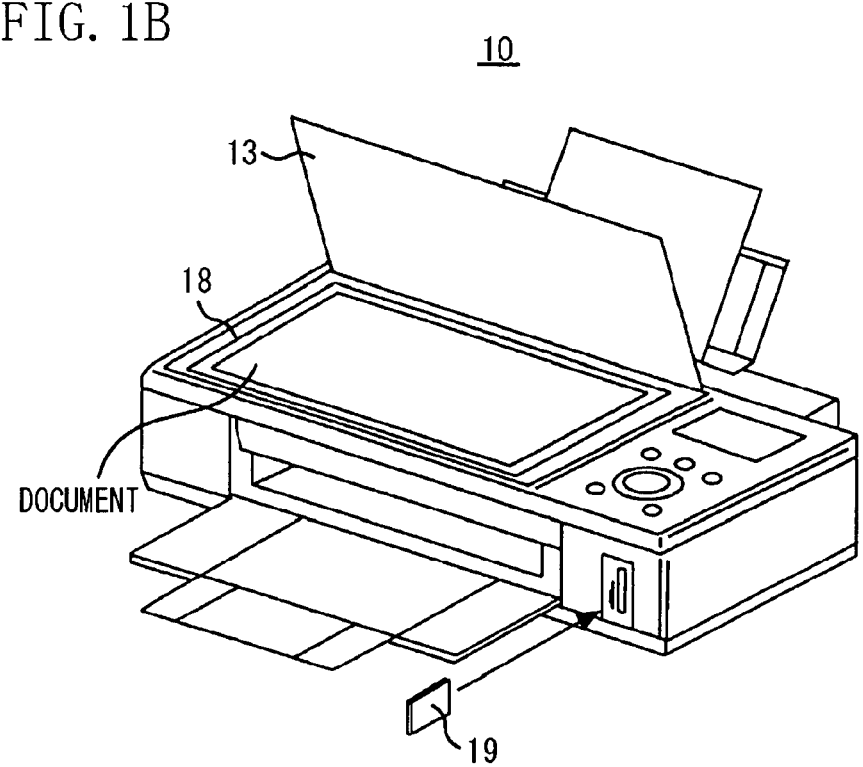
FIG. 1B illustrates an image processing apparatus when a document positioning plate cover is opened according to an exemplary embodiment of the present invention.

FIG. 1B illustrates the image processing apparatus 10 when the document positioning plate cover 13 is opened. When the document positioning plate cover 13 is opened, a document positioning plate 18 is exposed and a document can be placed thereon. The memory card 19 is inserted into the memory card slot 17 and data is read. Note that the memory card slot 17 may receive a secure digital (SD) memory card, a memory stick or the like.

Figure 2:
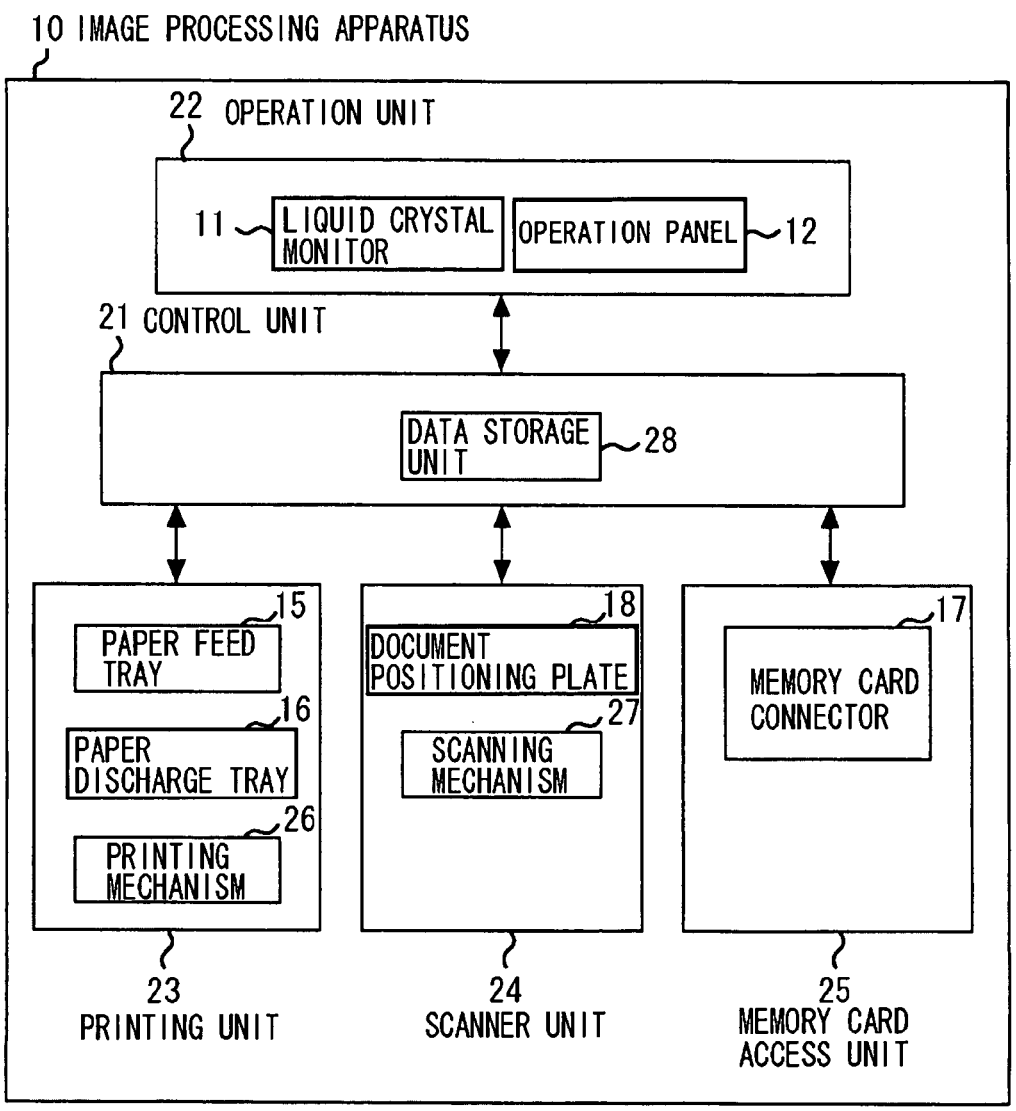
FIG. 2 is a block diagram illustrating a function of an image processing apparatus according to an exemplary embodiment of the present invention.

FIG. 2 is a block diagram illustrating a function of the image processing apparatus 10. The image processing apparatus 10 includes a control unit 21, an operation unit 22, a printing unit 23, a scanner unit 24, and a memory card access unit 25. The control unit 21 includes a data storage unit 28 and controls the image processing apparatus 10. The operation unit 22 includes the operation panel 12 and the liquid crystal monitor 11. The liquid crystal monitor 11 displays a state of the image processing apparatus 10. The operation unit 22 receives instructions from a user via the operation panel 12. The printing unit 23 executes a series of printing operations for printing a sheet 14 set on the paper feed tray 15 by a printing mechanism 26 and for discharging a sheet to the paper discharge tray 16 after printing. The scanner unit 24 optically reads image data from a document placed on the document positioning plate 18 using a scanning mechanism 27. The memory card access unit 25 reads image data that is stored in the memory card 19 inserted in the memory card slot 17.

In this image processing apparatus 10, print setting using a mark-sensing sheet includes the following steps when being roughly classified.

(1) The printing unit 23 prints a "photograph designation mark-sensing sheet" which allows a user to designate print setting for image data stored in the memory card 19, which is inserted in the memory card access unit 25.

(2) A user places it on the document positioning plate 18 after a user marks out the above-described photograph designation mark-sensing sheet and the scanner unit 24 optically reads the entered contents.

(3) The contents of print setting read from the mark-sensing sheet are displayed on the liquid crystal monitor 11 to allow a user to confirm the contents.

(4) When a mark mistake is not present on the mark-sensing sheet, a user gives instructions to read image data in the memory card 19 according to the read print setting, and the printing unit 23 prints it.

(5) When a mark mistake is present, a user revises the mark-sensing sheet. The image processing apparatus 10 rereads a mark-sensing sheet, and the processing returns to the above-described step (3).

In a print setting function using a mark-sensing sheet, the feature of the image processing apparatus 10 is step (5) in which a mark-sensing sheet is revised and reread. When a mark-sensing sheet including mark fields corresponding respectively to a plurality of options is read in the scanner unit 24, the image processing apparatus 10 detects mark in the above-described mark fields. The image processing apparatus 10 compares image data obtained by reading in step (2) and image data obtained by reading in step (5), and detects a mark field additionally marked by a user after executing reading in step (2). The image processing apparatus 10 determines that the user has selected an option corresponding to the detected mark field.

The details of a print setting function using a mark-sensing sheet will be described with centering on revision processing for revising a mark-sensing sheet.

Figure 3A:
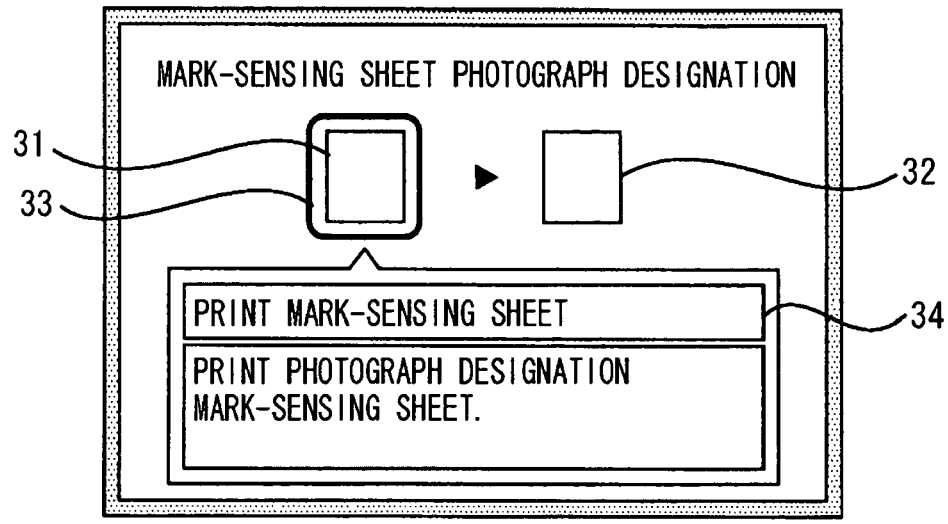
FIG. 3A illustrates a display screen of a "mark-sensing sheet photograph designation menu" to be displayed when a mark-sensing sheet print setting function is executed according to an exemplary embodiment of the present invention.

FIG. 3A illustrates a display screen 30 of a "mark-sensing sheet photograph designation menu" to be displayed thereon when a mark-sensing sheet print setting function is executed in the present exemplary embodiment. When the user presses a mark-sensing sheet photograph designation key (not shown) that is one of press buttons disposed on the operation panel 12, the display screen 30 displays a mark-sensing sheet photograph designation menu on the liquid crystal monitor 11. On the display screen 30, a mark-sensing sheet printing function icon 31, a mark-sensing sheet reading function icon 32, a cursor 33, and a guide display 34 are displayed. The mark-sensing sheet printing function icon 31 is used when the above-described photograph designation mark-sensing sheet is printed from the printing unit 23. The mark-sensing sheet reading function icon 32 is used when the above-described photograph designation mark-sensing sheet is read from the scanner unit 24. The cursor 33 is used for selecting the above-described two icons 31 and 32 by operating a right and left key (not shown) on the operation panel 12. FIG. 3A is in a state in which the mark-sensing sheet printing function icon 31 is selected.

Figure 3B:
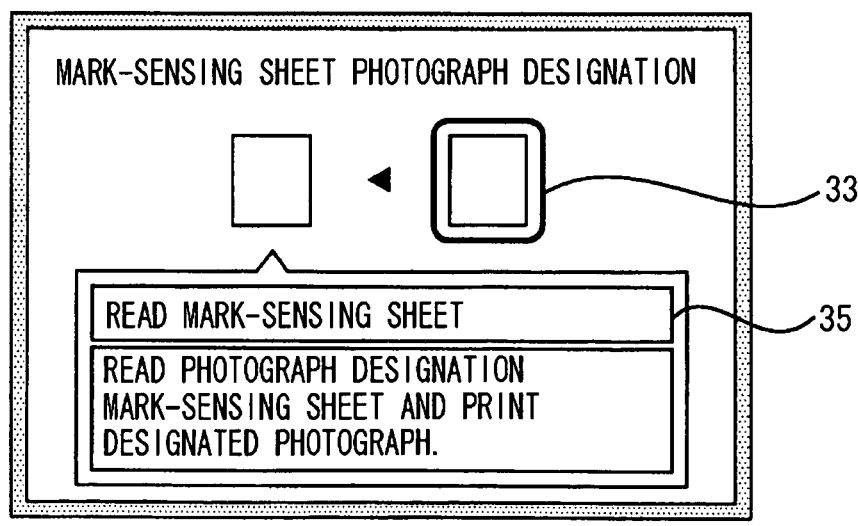
FIG. 3B illustrates a display screen when a cursor is moved from a state illustrated in FIG. 3A.

FIG. 3B illustrates the display screen 30 when a cursor is moved from a state shown in FIG. 3A. The cursor is moved to select the mark-sensing sheet reading function icon 32. When a determination key (not shown) on the operation panel 12 is pressed, a function on which the cursor 33 is positioned is executed. A guide display is used for describing the contents of a selected icon to a user. For example, a guide display 34 in FIG. 3A displays a guide for the mark-sensing sheet printing function icon 31 and a guide display 35 in FIG. 3B displays a guide for the mark-sensing sheet reading function icon 32.

Figure 4:
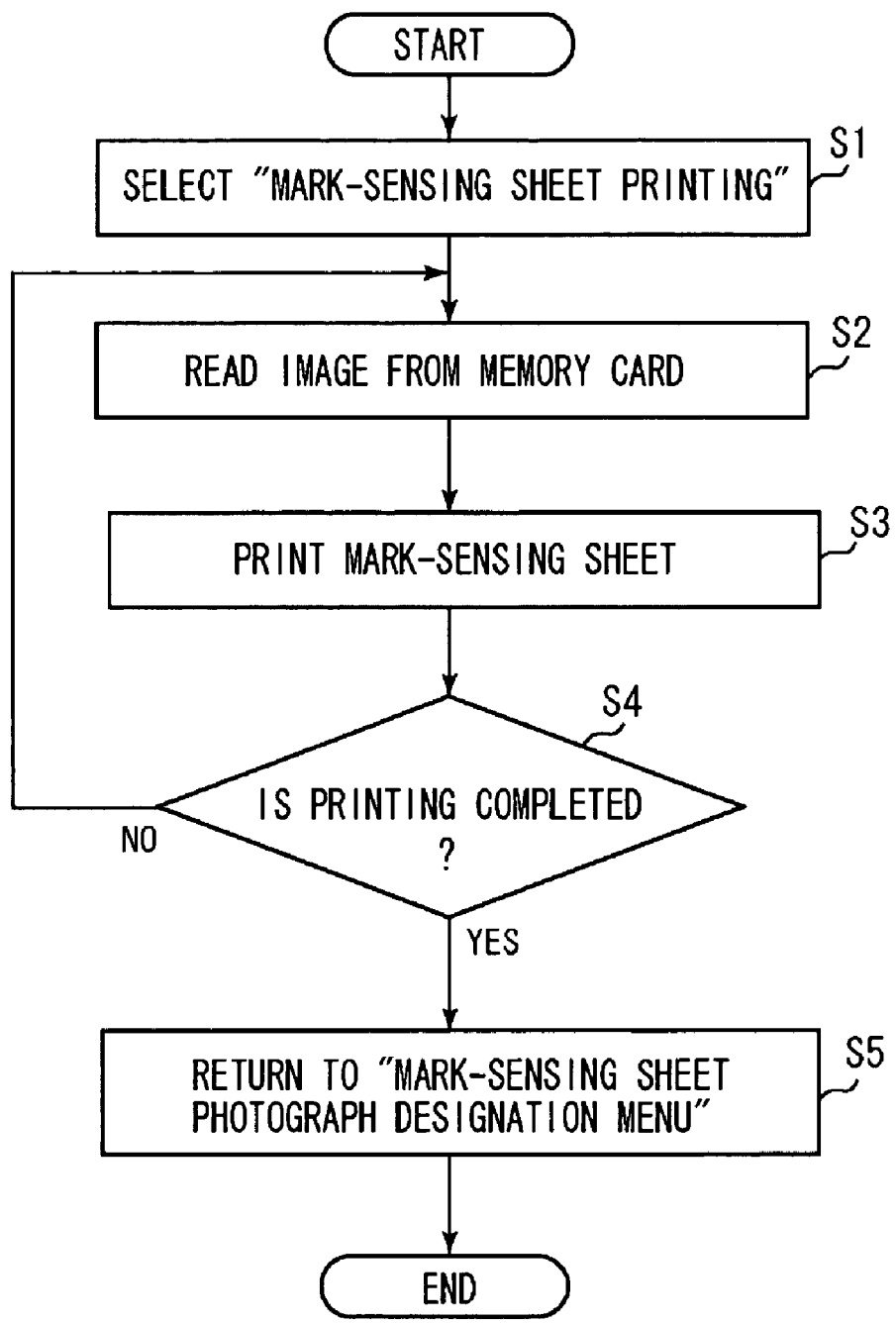
FIG. 4 is a flowchart illustrating an operation for printing a photograph designation mark-sensing sheet.
Figure 5:
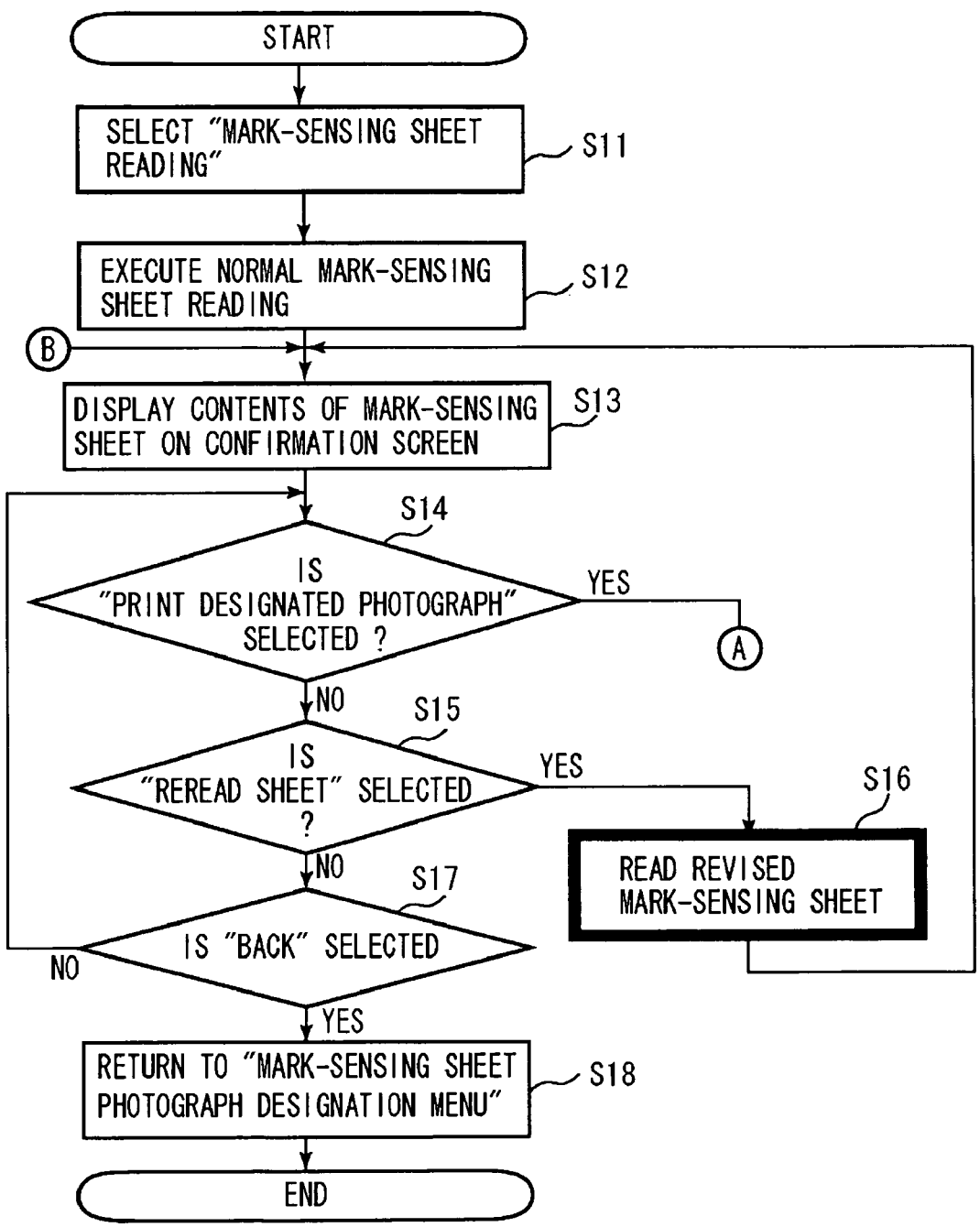
FIG. 5 is a flowchart illustrating a reading operation for reading a mark-sensing sheet according to an exemplary embodiment of the present invention.
Figure 6:
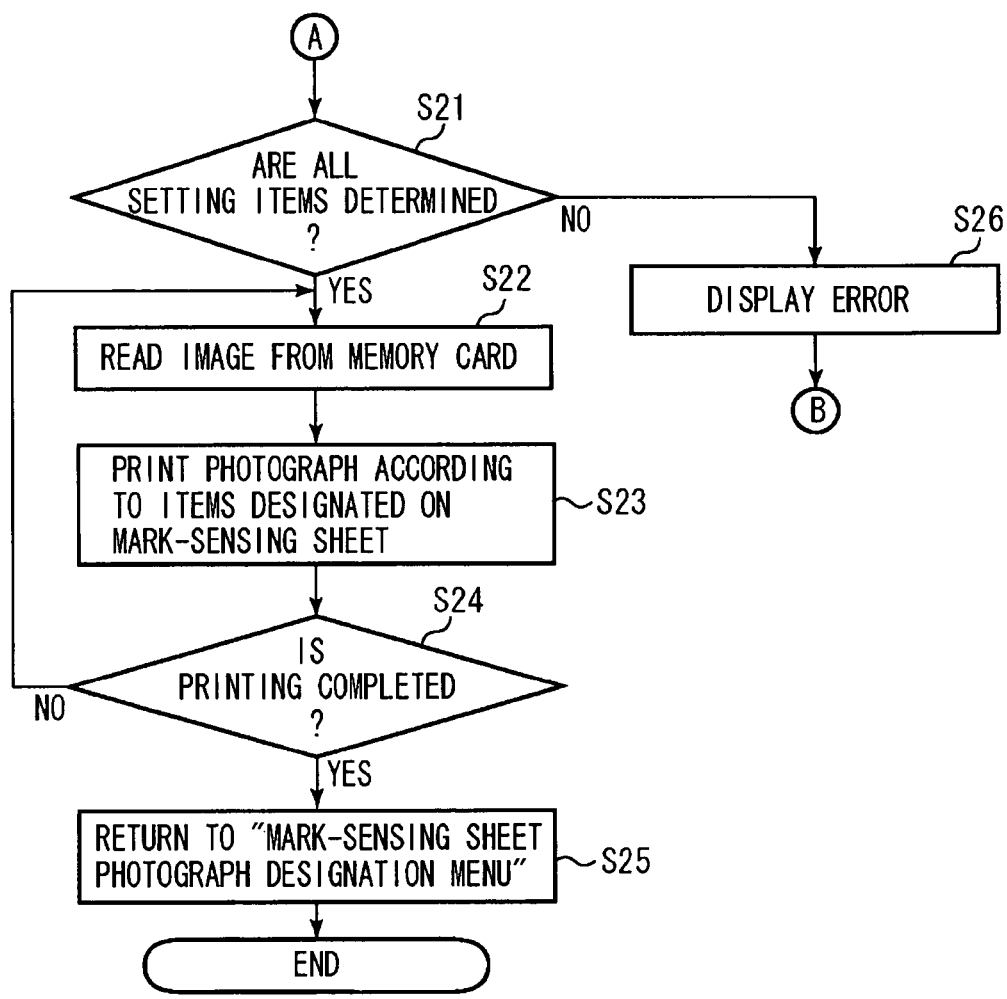
FIG. 6 is a flowchart illustrating a printing operation for printing a designated image according to an exemplary embodiment of the present invention.

Referring to FIGS. 4, 5 and 6, an operation of the image processing apparatus 10 will be described below.

FIG. 4 is a flowchart illustrating an operation for printing a photograph designation mark-sensing sheet. In step S1, an instruction by the user is input via the operation unit 22 and then printing of a mark-sensing sheet is selected. In step S2, the image processing apparatus 10 reads image data in the memory card 19 inserted in the memory card slot 17. In step S3, the printing unit 23 prints a photograph designation mark-sensing sheet that corresponds to the contents of a read image. In step S4, the image processing apparatus 10 determines whether the printing of the photograph designation mark-sensing sheet is completed. When the printing is not completed (NO in step S4), the processing returns to step S2. The image processing apparatus 10 reads image data. When it is determined that printing is completed (YES in step S4), the processing proceeds to step S5. In step S5, the image processing apparatus 10 displays a screen of a "mark-sensing sheet photograph designation menu."

FIG. 7 illustrates an example of a printed result of a photograph designation mark-sensing sheet. Such a sheet is printed in step S3 in FIG. 4. A photograph designation mark-sensing sheet 50 in FIG. 7 includes paper size setting 52, paper type setting 53, print quality setting 54, date print setting 55, image correction setting 56, photograph selection setting 57, an image number 58, and a thumbnail image 59. Further, a mark field 51 is used by the user to select a paper type by marking out the inside thereof with a pencil or a pen. By filling in this field, for example, an A4 size is selected as a paper size.

The paper size setting 52 is used for designating a size of a sheet to be printed. The paper type setting 53 is used for designating a type of paper such as plain paper, photographic paper, or the like. The print quality setting 54 is used for designating quality of printing. The date print setting 55 is used for designating date information printing on a printed image. The image correction setting 56 is used for determining whether to execute printing with optimal image corrections for an image. The photograph selection setting 57 is used for determining how many copies are printed for each of the images recorded in a memory card. For example, in the paper size setting 52, a mark field corresponding to each of four options of "L", "2L", "post card" and "A4" is printed, and a user marks one mark field among these. Thus, a size of a corresponding paper is selected.

When a user selects a photograph, different from other selection items, with respect to each image to be stored in a memory card, an image number 58 and thumbnail image 59 are printed side by side. A user fills in a mark field corresponding to the number arranged on its right side, thereby designating the number of images to be printed (number of copies). For example, when a mark field corresponding to "0" is filled in, printing is not executed. When a mark field corresponding to "2" is filled in, two copies for the image are printed. In the present exemplary embodiment, the number of copies from 0 to 3 for each image can be designated.

Figure 8:
FIG. 8 illustrates an example of a photograph designation mark-sensing sheet where mark fields, illustrated in FIG. 7, are marked.

FIG. 8 illustrates an example of a photograph designation mark-sensing sheet marked by the user. The user has marked the mark fields in a photograph designation mark-sensing sheet in FIG. 7. In this sheet, only one mark field for one selection item (for one image in photograph selection) is selected. In a photograph designation mark-sensing sheet 60, one mark field is filled in for each selected item. Specifically, mark fields are marked such that a paper size is "L", a paper type is "glossy paper", a print quality is "high quality", date printing is "NO", an image correction is "YES", 2 copies of an image number 02, a copy of an image number 03, 3 copies of an image number 04, and a copy of an image number 05. That may indicate a selection by a user.

FIGS. 5 and 6 are flowcharts illustrating a reading operation of a mark-sensing sheet in the present exemplary embodiment. In step S11, a user selects the mark-sensing sheet reading function icon 32 on the display screen 30 for displaying a mark-sensing sheet photograph designation menu. In step S12, the image processing apparatus 10 executes normal reading of a mark-sensing sheet. Reading in step S12 will be described below in FIG. 9.

Figure 10A:
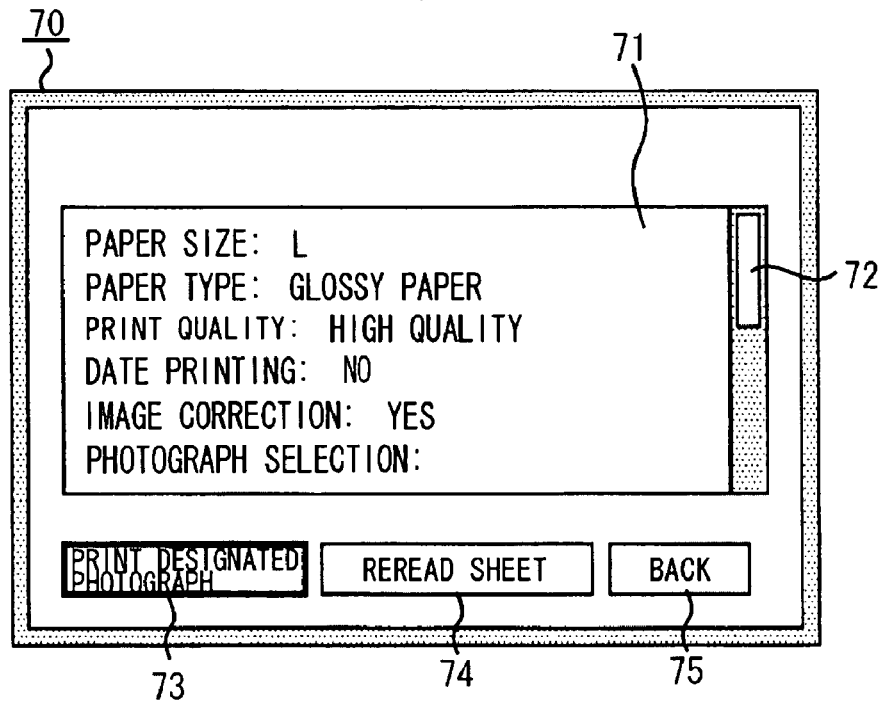
FIG. 10A illustrates a confirmation screen.

The image processing apparatus 10 analyzes the image data obtained by reading the mark-sensing sheet and determines mark fields that are marked among mark fields in a read mark-sensing sheet. In step S13, the image processing apparatus 10 displays the determined result on the liquid crystal monitor 11 in a form of a confirmation screen as the contents of a mark-sensing sheet. For example, when a confirmation screen 70 illustrated in FIG. 10A is displayed, the user can confirm the setting of the read mark-sensing sheet by checking the confirmation screen. When the user determines no mistake in the content is present, the user selects a print designated photograph icon 73. After a confirmation screen is displayed in step S13, in step S14, the image processing apparatus 10 determines whether an instruction to select the "print designated photograph" icon 73 is input via the operation unit 22 by the user. When the instructions to select the "print designated photograph" icon 73 is input via the operation unit 22 (YES in step S14), the image processing apparatus 10 starts printing a designated image. The printing of this designated image will be described later using a flowchart in FIG. 6.

When the instruction to select the "print designated photograph" icon 73 is not input to the operation unit 22 in step S14 (NO in step S14), then the processing proceeds to step S15. In step S15, the image processing apparatus 10 determines whether an instruction to select a reread sheet icon 74 is input to the operation unit 22. As a case in which the "print designated photograph" icon 73 is not selected, there can be a case in which, for example, when viewing the confirmation screen 70, the user is aware of a mistake in the set content of a mark-sensing sheet, and intends to change the setting. When it is determined that the instruction to select the reread sheet icon 74 is input to the operation unit 22 in step S15 (YES in step S15), then the processing proceeds to step S16. In step S16, the image processing apparatus 10 rereads a mark-sensing sheet and detects revised content from the sheet read in step S12. The reading in step S16 will be described below using a flowchart in FIG. 12. When rereading a sheet, a display can be executed which prompts the user of an operation for revising the mark-sensing sheet and rereading thereof.

In step S16, when a mark-sensing sheet is reread, the processing returns to step S13. The image processing apparatus 10 displays a confirmation screen in which the revised contents detected in step S16 is reflected. When the instruction to select the reread sheet icon 74 is not input to the operation unit 22 in step S15 (NO in step S15), then the processing proceeds to step S17. In step S17, the image processing apparatus 10 determines whether an instruction to select a return icon 75 is input to the operation unit 22 (NO in step S17). The image processing apparatus 10 repeats the processing in steps S14, S15 and S17 until an icon is selected. When the return icon 75 is selected (YES in step S17), the image processing apparatus 10 displays a menu screen in step S18.

FIG. 10A illustrates the confirmation screen 70. An example illustrated in FIG. 10A is a screen displayed in step S13 when an example photograph designation mark-sensing sheet marked as illustrated in FIG. 8 is read. On the confirmation screen 70, a display area 71, a scroll bar 72, and the "print designated photograph" icon 73 are displayed. The display area 71 displays each selected item and a set value after analysis. The "print designated photograph" icon 73 is a thumbnail image that is designated to print one or more copies.

In the present exemplary embodiment, since all setting items cannot be displayed on the confirmation screen 70 at one time, the image processing apparatus 10 has a function of scrolling the display of the display area 71 by operating an up and down key (not shown) on the operation panel 12. The scroll bar 72 indicates where the current displayed screen area is located in the entire screen area.

Figure 10B:
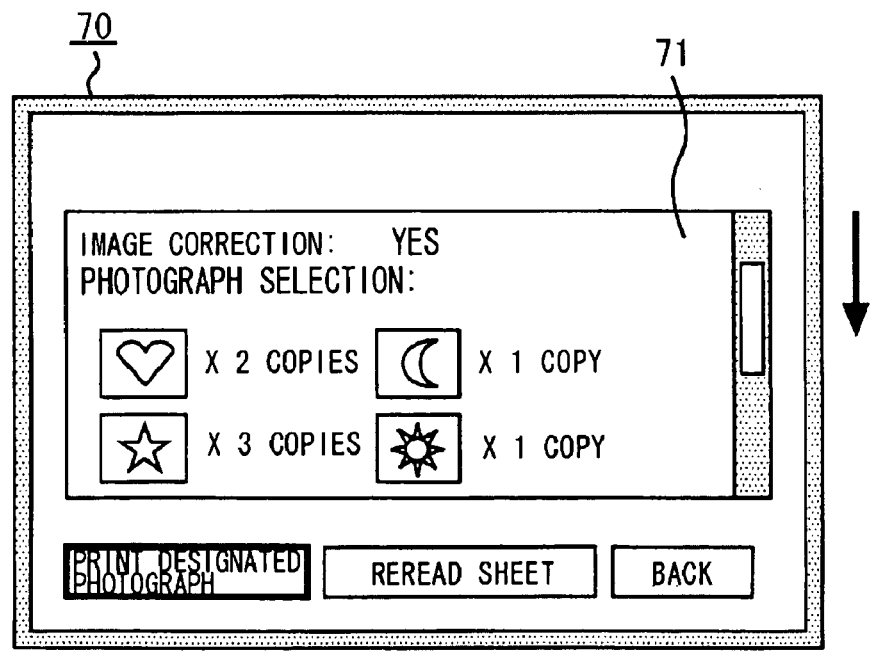
FIG. 10B illustrates a confirmation screen scrolled from a state shown in FIG. 10A.

FIG. 10B illustrates a confirmation screen scrolled from a state shown in FIG. 10A. For example, when a down key (not shown) is operated in a state illustrated in FIG. 10A, the displayed contents of the setting display area are scrolled upward to be a displayed state illustrated in FIG. 10B.

FIGS. 10A and 10B illustrate a case in which set items are selected. However, in a case in which a set item is not selected, "no set" is displayed on the right side of the set item. Anyone of icons 73, 74 and 75 is selected and highlighted by the right and left key (not shown) on the operation panel 12. In this state, when a determination key (not shown) is pressed, an operation corresponding to the selected icon among the three icons is performed. The "print designated photograph" icon 73 is selected when image printing is started based on image designation and print setting currently displayed. The "reread sheet" icon 74 is selected when entry in a sheet is revised which is read by the image processing apparatus 10 again. The "return" icon 75 is selected when returning to the display screen 30.

In step S16 in FIG. 5, when a confirmation display is executed after rereading a mark-sensing sheet, the confirmation display is similar to the previous display as shown in FIG. 10A. However, it is not limited to this. Options detected to have been revised may be displayed. For example, only revised options may be displayed. In the confirmation display shown in FIG. 10A, revised selection items can be emphasized such as by changing a display color or circling with a frame.

FIG. 6 is a flowchart illustrating a printing operation for printing a designated image. This processing is executed when an instruction to select the "print designated photograph" icon 73 is input to the operation unit 22 in step S14 in FIG. 5. In step S21, the image processing apparatus 10 determines whether all necessary setting items are set. In step S26, when all setting items are not set (NO in step S21), the image processing apparatus 10 displays an error message on a screen. Then, the processing returns to step S13, in FIG. 5, to displays the confirmation screen 70. In step S21, if all setting items are set (YES in step S21), the image processing apparatus 10 reads a corresponding image from the memory card 19 in step S22. In step S23, the image processing apparatus 10 prints an image according to the setting of each item. In step S24, the image processing apparatus 10 determines whether all selected images have been printed. In step S25, when printing of all images has been completed (YES in step S25), the image processing apparatus 10 returns to the menu screen 30. When it has not been completed (NO in step S24), the processing returns to step S22 and the processing from step S22 to step S24 is repeated.

Figure 9:
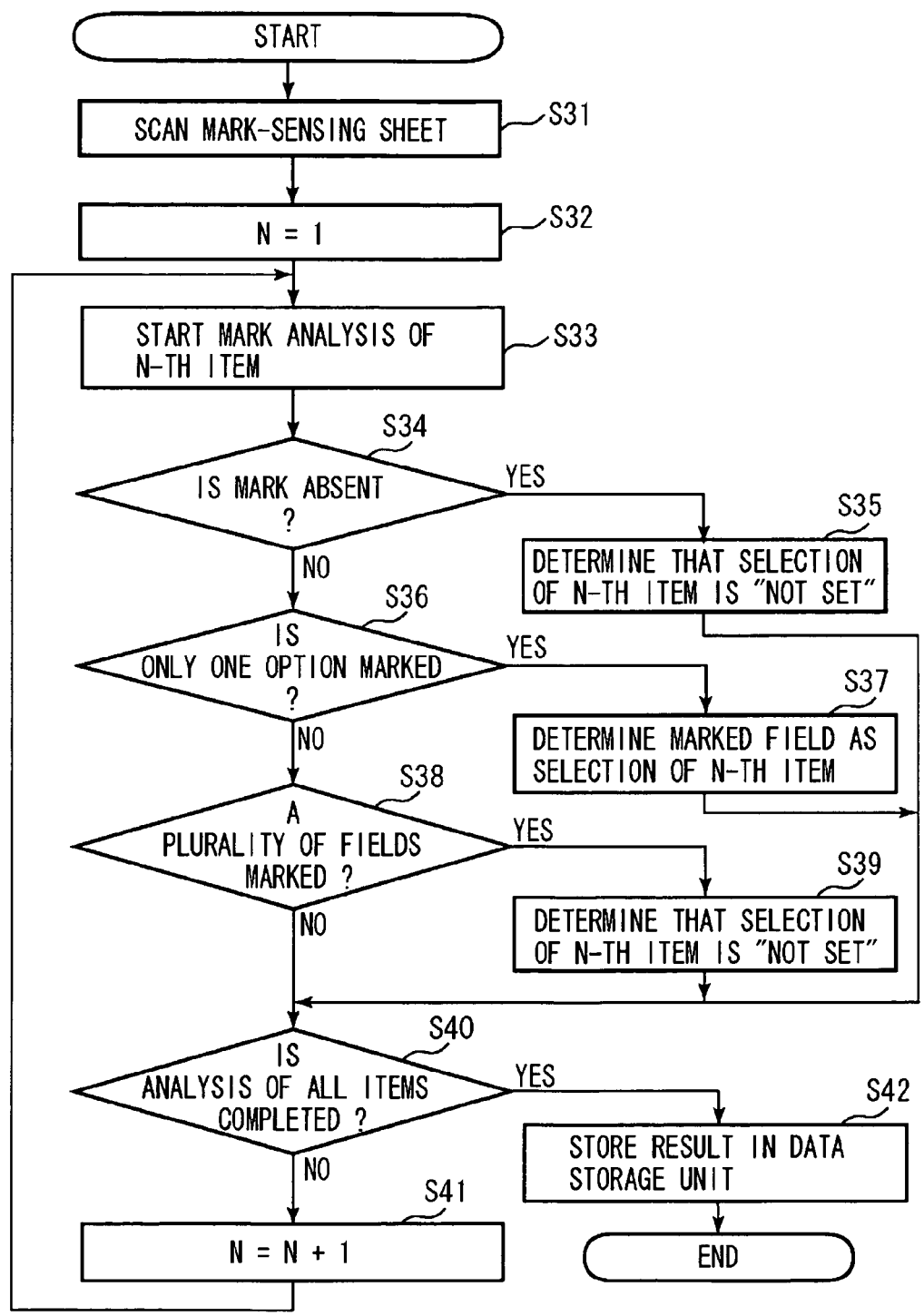
FIG. 9 is a flowchart illustrating reading operation for reading a mark-sensing sheet.

FIG. 9 is a flowchart illustrating a normal reading operation of a mark-sensing sheet. The flowchart illustrates the details of an operation in step S12 of the flowchart in FIG. 5. In step S31, the scanning mechanism 27 reads a mark-sensing sheet document placed on the document positioning plate 18 of the scanner unit 24. In step S32, the image processing apparatus 10 inputs an initial value "1" in a variable N. The variable N represents the number of selection items to have been analyzed on mark fields. In step S33, the image processing apparatus 10 executes analysis on an N-th selection item.

The analyzed contents with respect to each item are as follows. In step S34, the image processing apparatus 10 determines whether at least one mark field is filled in for the selection item. In step S35, when any mark field is not filled in, the image processing apparatus 10 determines that a selection for the item is "not set" (YES in step S34). When at least a mark field is filled in (NO in step S34), then the processing proceeds to step S36. In step S36, the image processing apparatus 10 determines whether only one mark field is filled in. When only one mark field is filled in (YES in step S36), then the processing proceeds to step S37. In step S37, the image processing apparatus 10 determines that the selection corresponding to the marked field is the selected value for the item. Further, in step S38, the image processing apparatus 10 determines whether a plurality of mark fields are filled in. If a plurality of mark fields are filled in (YES in step S38), the image processing apparatus 10 determines, in step S39, that the selection for the item is "not set".

If a plurality of mark fields are not filled in (NO in step S38), the processing proceeds to step S40. In step S40, the image processing apparatus 10 determines whether such analytical processing has been performed on all selection items. In step S41, when the analysis processing is not performed on all selection items (NO in step S40), the image processing apparatus 10 adds "1" to N, and then the processing returns to step S33. In the end, the processing in steps S34 to S39 is executed on all selection items from the first selection item to the last selection item in order. In step S42, when analysis of all selection items is completed (YES in step S40), the image processing apparatus 10 stores the result in the data storage unit 28 in the control unit 21. Note that the data storage unit 28 may store information that indicates which mark fields are marked based on read image data. Further, the data storage unit 28 may store the entire image data and detects which mark fields are filled at the time of reading.

When a mark-sensing sheet is read, the confirmation screen 70 is displayed in step S13 in FIG. 5. When a user finds out a setting item that is to be corrected among the setting items displayed on the confirmation screen 70, the user selects "reread sheet" among the items displayed on a screen. The user removes the mark-sensing sheet set on the document positioning plate 18, corrects the marked contents, and instructs to read the mark-sensing sheet again.

FIG. 11 illustrates a photograph designation mark-sensing sheet 80 in which designated content in the photograph designation mark-sensing sheet 60 are corrected. The photograph designation mark-sensing sheet 80 is corrected by the user in the three setting items 81, 82 and 83 of the photograph designation mark-sensing sheet 60. More specifically, date printing is changed from "NO" to "YES", the number of printing of an image number 01 is changed from "0" to "1," and the number of printing of an image number 03 is changed from "1" to "0." When the mark-sensing sheet in FIG. 8 and the sheet in FIG. 11 are compared, it is understood that a user does not erase a previously filled-in mark field with an eraser, a correction fluid, or the like in order to change the selection but additionally fills in a mark field that the user newly intends to select. The user places the photograph designation mark-sensing sheet 80 corrected in this way on the document positioning plate 18, selects the reread sheet icon 74, and starts the reading.

Figure 12:
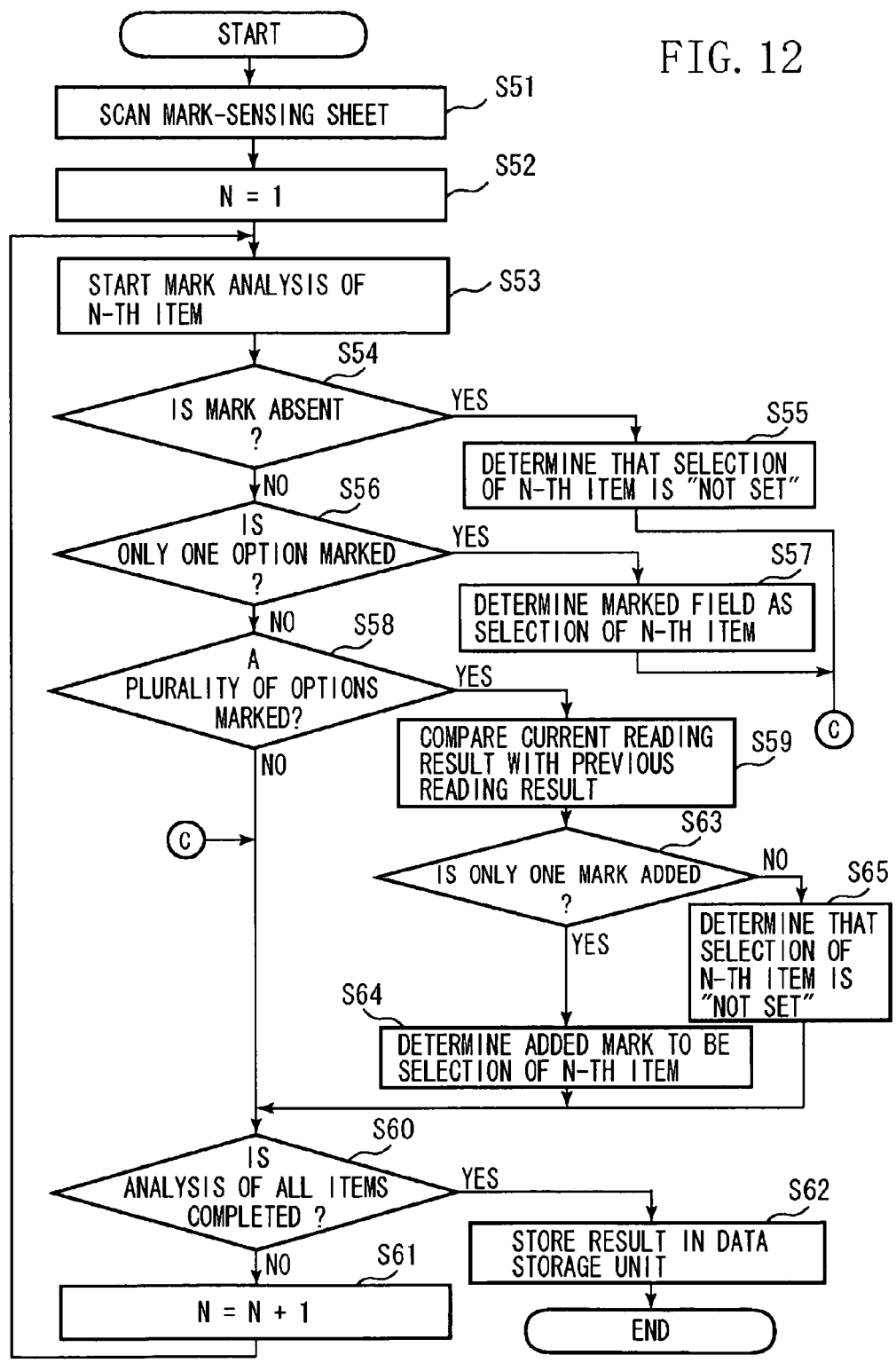
FIG. 12 is a flowchart illustrating internal analysis operation performed in rereading of a mark-sensing sheet.

Reading of a mark-sensing sheet corrected in this way is described below. FIG. 12 is a flowchart illustrating rereading of a mark-sensing sheet. In step S51, when a user selects the reread sheet icon 74, the image processing apparatus 10 scans a corrected mark-sensing sheet document placed on the document positioning plate 18. In step S52, the image processing apparatus 10 inputs an initial value 1 in a variable N. The value N represents the number of selection items in which a mark field is analyzed. In step S53, the image processing apparatus 10 executes analysis on an N-th selection item.

The analyzed contents with respect to each item are as follows. In step S54, the image processing apparatus 10 determines whether at least one mark field is filled in. When no mark field is filled in (YES in step S54), then in step S55, the image processing apparatus 10 determines that a selection for the item is "not set." When at least one mark field is filled in (NO in step S54), then in step S56, the image processing apparatus 10 determines whether only one field is filled in. When only one field is filled in (YES in step S56), then in step S57, the image processing apparatus 10 determines that the selection corresponding to the marked field is a selected value for the item. When only one field is not marked (NO in step S56), then the processing proceeds to step S58. In step S58, the image processing apparatus 10 determines whether a plurality of mark fields are filled in.

When it is determined that a plurality of mark fields are filled in (YES in step S58), in step S59, the image processing apparatus 10 compares a read result (previous read result) stored in the data storage unit 28 and a read result at this time. The processing is different from that of the normal reading.

As a result, when only one newly marked field is added other than the previously read result (YES in step S63), then in step S64, the image processing apparatus 10 determines that the added field is the correctly marked field. When no new mark is added or a plurality of new marks are added (NO in step S63), then in step S65, the image processing apparatus 10 determines that the setting item is "not set".

In step S60, the image processing apparatus 10 determines whether such analysis processing is performed on all setting items. When the analysis processing is not performed on all setting items (NO in step S60), then in step S61, the image processing apparatus 10 adds 1 to N and the processing returns to step S53. The processing of steps S54 to S59 and steps S63 to S65 is performed on all selection items from the first item to the last item in order. When analysis of all selection items is completed (YES in step S60), then in step S62, the image processing apparatus 10 stores the result in the data storage unit 28 in the control unit 21.

By comparing the reread sheet with the result of the normal reading, the image processing apparatus 10 can detect contents revised by the user. As illustrated in FIG. 5, the revised contents are reflected and the new analyzed result of the mark-sensing sheet is displayed as the confirmation screen 70. The user confirms the revised result on the confirmation screen 70. The user selects the "print designated photograph" icon 73 to print the image stored in the memory card based on the setting after revision. When the user intends to further revise, the user revises the mark-sensing sheet and selects the reread sheet icon 74 again.

Note that in the flowchart illustrated in FIG. 12, the selection is detected again for each selection item contained in the image data obtained by rereading. However, it is not limited to this. For example, when the read image data is stored in a data storage unit, the revised mark field for the selecting item may be determined not by comparing the read image data with each other for each selection item but by comparing the read image data.

Further, in the above-described description, the read result of the previous sheet is stored. However, a read result of a plurality of sheets can be stored to allow revision processing to the plurality of sheets. Thus, when a sheet is printed, a code such as a bar code for specifying a sheet can be printed on the sheet. Then, when reading it, this code is also read. When a read result is stored, information that a code indicates is also stored. Thus, when a sheet is reread, by selecting the data stored in a memory and having the same code as that of the data that is reread, revised processing can be performed on a plurality of sheets.

According to the method for revising a mark-sensing sheet in the present exemplary embodiment, the selection of the mark field can be changed to another mark field that was not previously selected. From selection 1 to selection 2, from selection 2 to selection 3, and from selection 3 to selection 4. The method cannot return the selection to the selection once selected. However, repeated revisions for a specified item or selection of a field once canceled does not occur often.

Note that in the present exemplary embodiment, an example of reading image data from a memory card is described, but the present invention is not limited to this. For example, in a technique of reading a sheet handwritten by a user to compose it with a photograph, the present invention is effective in changing various setting values for the composition. In this way, the present invention is effective in various types of control using a mark-sensing sheet. Further, a mark-sensing sheet is not limited to the type of the mark-sensing sheet the mark field of which is to be marked. The mark field of the mark-sensing sheet can be entered using a checkmark, a numeral or the like.

Further, in the present exemplary embodiment, a mark-sensing sheet is read to display contents selected by a user for confirmation. However it is not limited to this. Controls for printing or the like can be performed according to the selected contents without displaying the selected contents. For example, when a user makes no mark mistake and intends to change a setting and print it, since it is not necessary to erase the mark field of a sheet or reprint a sheet, the present invention is effective.

Note that in the above-described description, an image processing apparatus prints a mark-sensing sheet and reads it. However, the present invention is not limited to this. For example, the exemplary embodiments of the present invention can be achieved by an apparatus such as a personal computer (PC) connected to a printing apparatus and a reading apparatus, which causes the printing apparatus to print a mark-sensing sheet and the reading apparatus to read image data.

In that case, a recording medium storing a program code of software which realizes a function according to exemplary embodiments of the present invention may be provided in a system or an apparatus. In that case, a computer (or central processing unit (CPU) or micro processing unit (MPU)) in the system or the apparatus reads a program code stored in the recording medium and executes it, thereby accomplishing the present invention. In this case, the program code itself read from a storage medium realizes a function of the above-described exemplary embodiment. Thus, the present invention includes the storage medium storing the program code.

As a storage medium for providing a program code, for example, a floppy disk, a hard disk, an optical disk, a magneto-optical disk, a compact disc read only memory (CD-ROM), a compact disc recordable (CD-R), a magnetic tape, a nonvolatile memory card, a read only memory (ROM), a digital versatile disc (DVD), and the like can be used.

As described above, in exemplary embodiments of the present invention, when a user is aware of a mark mistake in a mark-sensing sheet after reading a marked mark-sensing sheet, the user can easily revise entered contents by entering in another mark field without erasing the field where a mark mistake was made. Thus, when revision is made, the revision can be made without using an eraser or a correction fluid, and without reprinting a mark-sensing sheet. Consequently, since an eraser, a correction fluid, and a sheet and ink for reprinting are not required, resources can be saved.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-081255 filed Mar. 26, 2008, which is hereby incorporated by reference herein in its entirety.

What is claimed is:

1. An image processing method comprising:
causing a printing apparatus to print a sheet containing a selection item, the selection item having a plurality of entry fields corresponding to a plurality of options to be selected for the selection item;
acquiring first image data obtained by a reading by a reading apparatus of the sheet on which an entry field among the plurality of entry fields is entered by a user;
acquiring second image data obtained by a new reading by the reading apparatus of the sheet after the reading corresponding to the acquiring of the first image data; and
detecting a revised entry field which is newly entered by the user as an option selected by the user for the selection item after the reading corresponding to the first image data, the revised entry field being detected by comparing between the acquired first image data and the acquired second image.

2. The image processing method according to claim 1, wherein the printing apparatus prints the sheet containing a plurality of selection items, each selection item having the plurality of entry fields corresponding to the plurality of options to be selected.

3. The image processing method according to claim 1, further comprising:
determining the entry field entered by the user for the selection item on the sheet based on each of the first image data and the second image data and executing a comparison of the entry field determined based on the first image data and the entry field determined based on the second image data,
wherein, the revised entry field is detected by the comparison.

4. The image processing method according to claim 1, further comprising:
displaying content of the selected option corresponding to the detected entry field for the selection item on the display screen,
wherein the second image data is acquired according to an instruction by a user based on the display.

5. The image processing method according to claim 4, wherein the displayed content is updated to include the selected option corresponding to the revised entry field entered by the user for the selection item.

6. The image processing method according to claim 1, wherein the sheet contains a code for identifying the sheet and the revised entry field is detected based on the first image data and the second image data in a case where the sheet being identified with the code included in the first image data and the sheet being identified with the code included in the second image data are the same.

7. The image processing method according to claim 2, further comprising:
determining a selection item of which a plurality of entry fields are entered by a user among the plurality of selection items on the sheet, based on the acquired image data;
wherein the revised entry field of the determined selection item is detected.

8. The image processing method according to claim 1, further comprising:
controlling the image processing apparatus based on the option corresponding to the revised entry field which is newly selected.

9. The image processing method according to claim 8, wherein the image processing apparatus, by controlling, causes the printing apparatus to print an image according to a print setting corresponding to the revised entry field.

10. The image processing method according to claim 8, wherein the image processing apparatus is controlled using the option corresponding to the revised entry field for the selection item without using an option corresponding to an entry field which is entered for the selection item in the first image data.

11. A non-transitory computer readable recording medium storing a program that causes a computer to execute an image processing method, the image processing method comprising:
causing a printing apparatus to print a sheet containing a selection item, the selection item having a plurality of entry fields corresponding to a plurality of options to be selected for the selection item;
acquiring first image data obtained by a reading by a reading apparatus of the sheet on which an entry field among the plurality of entry fields is entered by a user;
acquiring second image data obtained by a new reading by the reading apparatus of the sheet after the reading corresponding to the acquiring of the first image data;
detecting a revised entry field which is newly entered by the user as an option selected by the user for the selection item after the reading corresponding to the first image data, the revised entry field being detected by comparing between the acquired first image data and the second image data.

12. An image processing apparatus comprising:
a printing control unit configured to cause a printing apparatus to print a sheet containing a selection item, the selection item having a plurality of entry fields corresponding to a plurality of options to be selected for the selection item;
an acquiring unit configured to acquire image data obtained by a reading by a reading apparatus of the sheet which is printed by the print control unit and on which an entry field among the plurality of entry fields is entered by a user;
a detection unit configured to, when first image data obtained by a reading of the sheet and second image data obtained by a new reading of the sheet after the reading corresponding to the acquisition of the first image data are acquired by the acquiring unit, detect a revised entry field entered by the user for the selection item after the reading corresponding to the first image data the revised entry field being detected by comparing between the first image data and the second image data.

* * * * *